May 24, 1960 W. A. PLUMMER 2,937,664
SELF-SUPPORTING FLEXIBLE DUCTING
Filed Oct. 1, 1957
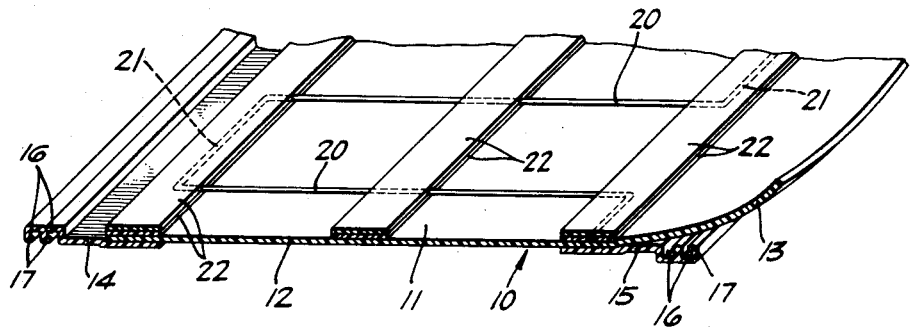
FIG. 1.
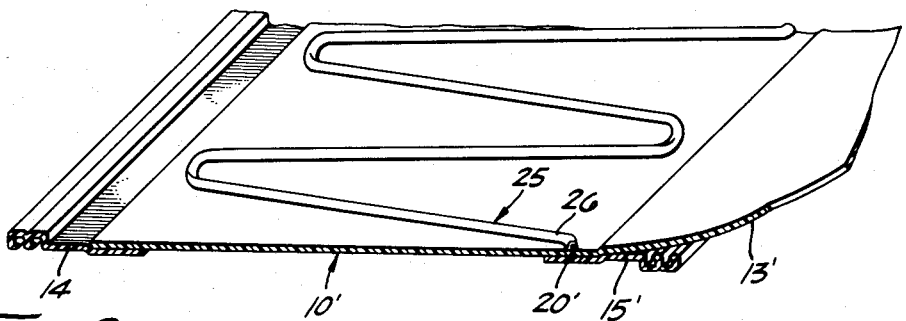
FIG. 2.
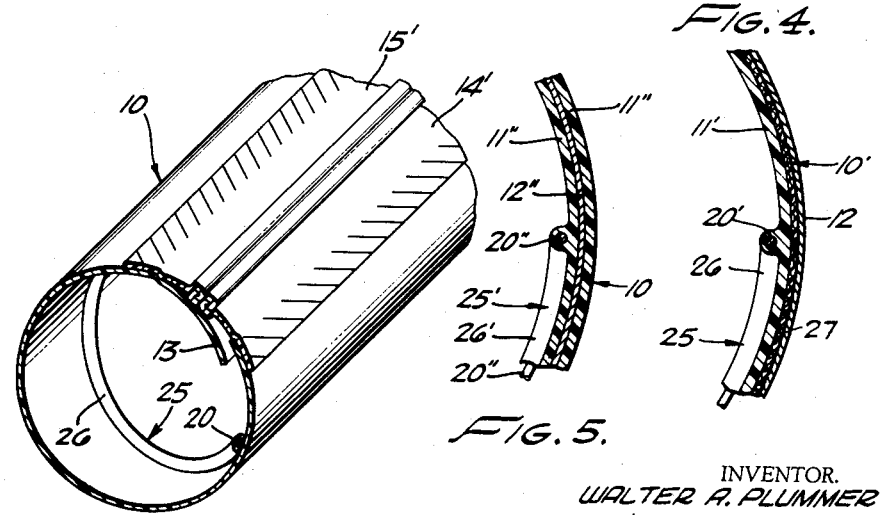
FIG. 3.
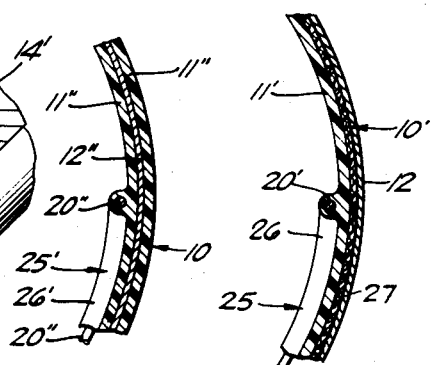
FIG. 4.
FIG. 5.
INVENTOR.
WALTER A. PLUMMER
BY
ATTORNEY

United States Patent Office 2,937,664
Patented May 24, 1960

2,937,664

SELF-SUPPORTING FLEXIBLE DUCTING

Walter A. Plummer, 13071 Dickens St., North Hollywood, Calif.

Filed Oct. 1, 1957, Ser. No. 687,450

19 Claims. (Cl. 138—56)

This invention relates to flexible plastic ducting and more particularly to a laminated ducting manufactured and shipped in disassembled condition in readiness to be assembled into self-supporting flexible ducting at the point of use.

Recent techniques in the manufacture of sheet plastic materials have made it feasible to employ plastic in making ducting for conveying low pressure fluids and particularly gaseous fluids from place to place. Such ducting is relatively inexpensive, of light weight and easily routed around obstacles without restricting the flow objectionably. The material is easily formed and joined together but nonetheless is subject to certain disadvantages obviated by the present invention. Chief among these is the fact that thin-walled plastic ducting is not self-sustaining and will not retain its shape and will not remain extended except when held inflated under slight pressure. Partially collapsed ducting is not only very unsightly but is ineffective from a functional standpoint where the fluid pressures being handled are of necessity low as they often are, for example, in hot air heating systems.

Although plastic suitable for use in making ducting has relatively good heat-insulating qualities, yet the thin-walled sections required for strength and fluid tightness are such that heat losses are objectionably high. Still another serious shortcoming of prior ducting designs is the lack of a satisfactory construction adapted to be shipped disassembled with the ducting side walls lying flat so that they can be reeled for very compact storage and shipping and for later assembly at the point of use into a fluid-tight self-supporting tube.

The foregoing and other shortcomings of prior ducting designs are entirely obviated by the present invention wherein the body of the ducting is preferably formed from thin laminated strip stock having its edges formed with integral interlocking tongues and grooves which can be interengaged with one another at the point of use to provide a fluid-tight longitudinal seam. The laminate includes a layer of heat-reflecting metal foil one surface of which is effective to reflect heat back into the interior of the ducting and the outer surface of which is equally effective in preventing heat losses. To add resilient rigidity to the laminate and further supplementing this material in holding the seam sealed close, there is provided resilient reinforcing integrally attached to the laminate and effective in holding the same flat before assembly of the ducting. Upon assembling, however, the resilient reinforcing material is so arranged as to place the laminate under circumferential tension for several useful purposes including that of maintaining the contacting surfaces of the joint structure tightly sealed against one another.

The novel ducting construction to be disclosed in detail below also includes an integral flap arranged to lie across the interior side of the seam whereby the pressure of the fluids being conveyed are effective to hold this flap pressed tightly against the seam thereby aiding further in holdng the same closed and in preventing fluid leakage. In fact, the pressure contact maintained between the contacting surfaces of the guard flap and the tubing wall are found very effective in maintaining a pressure seal even where there are imperfections or other irregularities in the seam proper which would otherwise permit leakage. The guard flap is particularly effective in preventing leaks and the opening of the seam when the ducting is bent or otherwise deformed around corners or obstacles.

Accordingly, it is a primary object of the present invention to provide an improved flexible ducting formed principally of plastic material and adapted to be assembled in a fluid-tight manner at the point of use.

Another object of the invention is the provision of improved flexible ducting having a laminated body formed of sheets of plastic and of metal bonded together, the metal having one or more polished surfaces effective as heat reflectors.

Another object of the invention is the provision of plastic ducting formed from an elongated strip of plastic material shaped along its lateral edges in a manner to interlock and provide a fluid-tight seam and incorporating in the body portion thereof resilient reinforcing material effective in holding the side walls of the ducting extended and self-supporting independently of internal fluid pressure conditions.

Another object of the invention is the provision of flexible plastic ducting having continuous tongues and grooves along the lateral edges of its main body and adapted to be interlocked with one another to form a fluid-tight seam, and wherein said ducting incorporates resilient means in its side wall effective to place the ducting in circumferential tension on either side of said seam.

Another object is the provision of plastic ducting adapted to be manufactured and shipped to the point of use in disassembled condition and including an internal flap adapted to extend across the interior of the seam formed between the overlapped edges of the strip and cooperating therewith when fluids under pressure are passing through the ducting to prevent escape of fluids.

These and other more specific objects will appear upon reading the following specification and claims and upon considering in connection therewith the attached drawing to which they relate.

Referring now to the drawing in which preferred embodiments of the invention are illustrated:

Figure 1 is a view in perspective showing a short strip of the material incorporating features of the invention from which ducting can be formed when the tongues and grooves along its lateral edges are interlocked;

Figure 2 is a similar view of a modified embodiment of the ducting in disassembled condition;

Figure 3 is a view in perspective of the ducting according to Figure 2 in assembled condition;

Figure 4 is an enlarged sectional view of the ducting; and

Figure 5 is an enlarged sectional view through an alternate laminate structure useful in constructing ductings in accordance with the present invention.

According to one preferred embodiment of the invention illustrated in Figure 1, the ducting of the present invention comprises a main body formed from an elongated strip of laminate including at least one thin sheet 11 of plastic and one sheet of aluminum foil 12 suitably bonded together in known manner. Although various plastic materials may be employed, the polyethylene and the vinyl plastics are particularly suitable, these materials being easily formed in thin sheet form, being impervious to gaseous mediums, and remaining flexible under a wide range of temperature conditions including the low sub-zero temperatures and temperatures well in excess of 125 degrees F.

Certain advantages are to be enjoyed if three plys of material are employed in forming the laminate in which event metal foil is bonded between layers of plastic. When only a single layer of plastic is used the foil is applied in two strips spaced to leave plastic exposed at those points to which it is desired to fuse other plastic elements such as, for example, the plastic strips to be described presently and employed in securing the reinforcing material to the laminate, or opposite the areas to which it is desired to fuse the slide fastener strips. Accordingly, it will be understood that main body 10 shown in Figure 1 may consist of either two or three layers. It will be noted that one lateral edge of the main body preferably serves as the guard flap designed to overlie and extend beyond the seam with which the main body is provided for the purpose of holding the same closed in tubular form in the assembled position of the ducting.

The means preferably employed for forming a fluid-tight seal for the strip material comprises identical strips 14 and 15 of plastic material having along one edge thereof complementary shaped tongues and grooves shaped to interlock with one another.

Secured by fuse bonding to the opposite lateral edge portions of the main body 10 are identical strips of extruded plastic slide fastener tapes 14 and 15 of any suitable configuration, that disclosed in my co-pending application Serial No. 687,399, filed on October 1, 1957, now abandoned, being particularly suitable. These identical tapes are bonded to the exterior body of the ducting with the grooves 16 and the tongues 17 of each facing in opposite directions in the manner clearly illustrated in Figure 1 to the end that the tongues of one may be interleaved or inserted in the grooves of the other tape to form an interlocked seam extending longitudinally of the ducting as is illustrated in Figure 3. The tongues and grooves may be pressed together progressively, either by pressure applied radially across the joint by finger pressure or, in the alternative, a slide fastener device of the type disclosed in the aforesaid application may be used. It is pointed out that the guard flap 13 has a circumferential width sufficient to overlap the seam with a considerable margin of safety. This soft, pliant flap lies closely against the interior of the closed seam with the result that fluid pressure within the ducting is effective to press the flap into firm contact with the underlying portions of the seam and of the ducting wall. The greater the internal pressure, the greater is the seal provided by this surface contact between the guard flap and the outer wall. This fact is of particular importance in sections of the ducting being bent to bypass obstacles or for other reasons since flexure of the ducting has a tendency to open the seam. The frictional contact provided by the pressure against the guard flap reinforces the steam against such opening and, additionally, provides a secondary fluid seal with the interior wall surface.

A further important feature of the ducting adds greatly to the sealing characteristics of the described seam structure and also provides important additional functions. Reference is had to the small diameter resilient wire reinforcing 20 preferably having a serpentine configuration such as that illustrated in Figure 1. As there shown, the wire reinforcing comprises straight lengths extending transversely of the laminated body of the ducting and interconnected alternately at their ends by straight lengths 21 parallel to the lateral edges of the ducting. The reinforcing member 20 may be secured to the surface of the laminate body in any suitable manner, a preferred mode being illustrated in Figure 1. In this anchoring method wire 20 is sandwiched between pairs of plastic strips 22, two pairs being arranged over crest portions 21 and another pair being arranged crosswise of the straight lengths between the crest portions. This assembly is subjected to pressure and heat sufficient to bond the contacting surfaces of the plastic strips together about the intervening wire to provide an integral reinforcing sub-assembly. This sub-assembly is then fuse bonded to ducting 10 along with the slide fastener strips 14 and 15, the slide fastener strips being secured to one face of the main body in the locations illustrated in Figure 1 and the reinforcing sub-assembly being secured to the opposite side of the ducting.

In an alternate mode of assembly the reinforcing wire may be laid directly against the surface of the ducting strip and anchored in place by applying the exterior layer of strips 22 over the reinforcing as heat and pressure are applied to fuse the strips to the ducting body. It will therefore be apparent that this method differs from the first-described method in the omission of the underlying one of strips 22 and, additionally, in the fact that the strips are not anchored to the serpentine wire prior to the assembly of this unit to the ducting proper.

Referring to the second preferred embodiment illustrated in Figure 2, an assembly is shown using a fewer number of components, this being achieved by the use of plastic covering reinforcing wire fused along its entire length to the laminate main body 10' of the ducting. It will be understood that the laminate and the seam-forming interlocking tapes 14', 15' are identical with those described above. The reinforcing designated generally 25 comprises an inner resilient wire 20' coated with plastic 26 of a type which fuses to the surface of the ducting when heated and pressed thereagainst under pressure. As will be observed, reinforcing 25 has a generally sinusoidal configuration the rounded relatively narrow crests of which are arranged in rows adjacent the opposite edges of the ducting body. The reinforcing is prepared for assembly to the ducting simply by bending it to the shape shown and feeding the same in preheated condition against the heated main body 10' under sufficient pressure to fuse the contacting surfaces together.

The plastic covering completely encases the wire and protects it against corrosion or attack by the fluids passing through the duct. Owing to the resilience of the wire and its initial flat shape as shown in Figure 2, the flexure of the ducting crosswise to form a tubular conduit stores stress in the resilient reinforcing. These stored stresses are available to tension the ducting circumferentially, such tension having a maximum value across the seam formed by interlocked tapes 14', 15'. This tension acts to hold the contacting tongues and grooves of the seam in firm and resilient contact thereby strengthening the fluid-tight character of the seam. Additionally and importantly, this tension maintains the ducting walls fully extended at all times and renders the ducting fully self-supporting both radially and longitudinally.

Referring to Figure 4, there is shown a greatly magnified and distorted sectional view of the second embodiment. According to this arrangement, the inner side wall of the ducting is formed by a plastic sheet 11' securely bonded to an intermediate sheet of fiberglass fabric 27 and an outer aluminum foil layer 12'. The plastic-covered reinforcing wire 25 comprises a resilient wire 20' encased in plastic 26 and bonded integrally against the interior layer of plastic 11'.

In an alternate construction illustrated in Figure 5, the laminate structure comprises inner and outer layers of plastic 11" bonded to the opposite surfaces of aluminum foil 12". The reinforcing wire 25' is identical with that described in connection with Figure 4 and includes a resilient wire 20" encased in plastic 26' and fused to the inner wall 11"'.

While the particular self-supporting flexible ducting herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. Flexible self-supporting ducting adapted to be disassembled for shipping flat and to be assembled into ducting at the point of use, said ducting comprising a thin body of flexible sheet plastic having interfitting tongues and grooves separably interlockable to form a duct and extending longitudinally along its lateral edges and including an integral flap underlying said tongues and grooves in the assembled position of said tongues and grooves, and continuous resilient reinforcing means extending crosswise and along said flexible sheet and secured thereto, said reinforcing means being effective to support said thin sheet in tubular form when said tongues and grooves are interlocked whereby said tube is self-supporting.

2. Flexible ducting as defined in claim 1 characterized in that all components thereof are fused into an integral one-piece assembly as manufactured in instant readiness for the formation of a self-supporting duct upon pressing said tongues and grooves together.

3. Flexible ducting as defined in claim 1 characterized in that said reinforcing comprises resilient wire effective to hold said sheet plastic in a flat planar condition upon the separation of said tongues and grooves from one another and being effective to hold the tube walls resiliently extending to provide a tubular duct when said tongues and grooves are interlocked with one another.

4. Flexible ducting as defined in claim 3 characterized in that said reinforcing member comprises plastic-covered wire fused to said thin body of flexible sheet plastic.

5. Flexible ducting as defined in claim 3 characterized in that said reinforcing member comprises resilient wire having a serpentine contour lying against one surface of said thin sheet plastic, and strip plastic means extending across said wire at intervals and bonded to said sheet for holding said resilient reinforcing wire assembled to said ducting.

6. A self-supporting lightweight plastic material suitable for assembly into ducting for conducting air and the like gaseous fluids, said material comprising a main body of sheet plastic material having bonded thereto a heat-reflecting layer of aluminum foil and provided along its lateral edges with plastic slide fastener strips one of said strips being fused to said sheet plastic inwardly of one lateral edge to provide a guard flap underlying said slide fastener strips when secured together in interlocking engagement, and resilient wire reinforcing means extending transversely and longitudinally of said sheet plastic and secured thereto, said reinforcing being effective to support said ducting walls in tubular form when said slide fastener strips are interlocked.

7. Heat-reflecting flexible plastic ducting adapted to be packaged and shipped flat and having integral interlocking means so disposed as to form ducting having a longitudinal seam, said ducting comprising a thin flexible strip of plastic laminate including at least one layer of plastic and a layer of heat-reflective metal foil, and the opposite lateral edge portions of said strip being provided with a plurality of complemental tongue and groove means extending from end to end of said strip, a guard flap integral with one edge of said strip and overlying said tongue and groove means, said tongues and grooves near one edge facing oppositely to those along the other edge and interlocking with one another to form a fluid-tight seam bridged on its interior side by said guard flap.

8. Heat-reflecting flexible plastic ducting as defined in claim 7 characterized in that said laminate includes a fiberglass reinforcing sandwiched between a layer of foil and a layer of plastic.

9. Heat-reflecting flexible plastic ducting as defined in claim 7 characterized in the provision of flexible serpentine reinforcing means secured to one surface of said laminate strip, said reinforcing means extending transversely of said strip from end to end thereof and acting to hold the walls of said ducting extended in tubular form and rendering the ducting self-supporting.

10. Ducting as defined in claim 9 characterized in the provision of plastic means bonded to a surface of said laminate strip and effective to hold said reinforcing means in place adjacent one surface thereof.

11. Ducting as defined in claim 9 characterized in that said reinforcing means comprises plastic-coated wire having its plastic coating bonded to the interior surface of said ducting.

12. Heat-reflecting flexible plastic ducting adapted to be packaged and shipped flat and having integral interlocking means along its opposite lateral edges interengageable to provide a fluid-tight duct, said ducting including a thin laminated main body incorporating at least one layer of plastic and a layer of aluminum foil, said main body being characterized by the provision on the interior side thereof of a serpentine flexible reinforcing wire, and spaced apart strips of plastic extending lengthwise of said ducting and bonded to underlying portions of said main body for holding said reinforcing wire secured in place thereon.

13. Heat-reflecting flexible plastic ducting adapted to be packaged and shipped flat and having integral interlocking means along its opposite lateral edges interengageable to provide a fluid-tight duct, said ducting including a thin laminated main body incorporating a layer of heat-reflective aluminum foil, a serpentine reinforcing metal element extending from end to end of said ducting, said metal element being held assembled to said foil between strips of plastic bonded together along the opposite sides of said serpentine element and one of said strips being bonded to said layer of foil substantially throughout the surface area on at least one side thereof.

14. Self-supporting flexible-walled plastic duct forming material adapted to be shipped disassembled for assembly into tubular ducting at the point of use, said material comprising a flexible laminate of sheet plastic and of sheet heat-reflecting metal foil having secured thereto resilient reinforcing material, said reinforcing material having a serpentine configuration with all parts thereof initially lying in a common plane and with the crests thereof lying adjacent the lateral edges of an elongated strip of said laminate, and longitudinal seam means along the opposite edge portions of said laminate forming a duct therefrom having a fluid-tight longitudinal seam extending therealong, said reinforcing material tending to open said seam and acting to hold a major portion of the duct walls on either side of said seam under circumferential tension.

15. Dust forming material as defined in claim 14 characterized by the fact that said longitudinal seam means includes interlockable tongues and grooves formed to have surface-contacting areas thereof held in fluid-tight sealing engagement by the circumferentially acting tensioning applied by said resilient reinforcing material.

16. Duct forming material as defined in claim 14 characterized in that said reinforcing material comprises resilient wire formed into serpentine configuration having rounded crests positioned in rows adjacent the lateral edges of said laminate strip.

17. Duct forming material as defined in claim 14 characterized in that said reinforcing material comprises resilient wire formed into serpentine configuration having substantially straight crests divided into rows lying close to and generally parallel to either lateral edge of said laminate strip.

18. Duct forming material as defined in claim 16 characterized in that said reinforcing wire is covered with plastic fused to said plastic and metal laminate.

19. Duct forming material as defined in claim 17 characterized in that said reinforcing wire is covered with plastic fused to said plastic and metal laminate.

References Cited in the file of this patent

UNITED STATES PATENTS

| | | |
|---|---|---|
| 837,512 | Seeley | Dec. 4, 1906 |
| 1,577,050 | Weigel | Mar. 16, 1926 |
| 1,863,624 | Evans | June 21, 1932 |
| 2,756,172 | Kidd | July 24, 1956 |
| 2,759,522 | Limm | Aug. 21, 1956 |
| 2,782,803 | Rothermel et al. | Feb. 26, 1957 |

FOREIGN PATENTS

| | | |
|---|---|---|
| 18,955 | Great Britain | Sept. 2, 1904 |